(12) United States Patent
Lightstone et al.

(10) Patent No.: US 7,584,475 B1
(45) Date of Patent: Sep. 1, 2009

(54) MANAGING A VIDEO ENCODER TO FACILITATE LOADING AND EXECUTING ANOTHER PROGRAM

(75) Inventors: Michael L. Lightstone, Fremont, CA (US); Stefan Eckart, Munich (DE); Hassane S. Azar, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 1214 days.

(21) Appl. No.: 10/719,775

(22) Filed: Nov. 20, 2003

(51) Int. Cl.
*G06F 9/46* (2006.01)
*G06F 11/30* (2006.01)
*H04N 7/14* (2006.01)
*H04B 1/66* (2006.01)

(52) U.S. Cl. .................... 718/104; 718/100; 348/14.01; 375/240; 702/182

(58) Field of Classification Search ................ 718/100, 718/104, 105; 725/20; 713/300, 322; 348/14.01; 375/240; 702/182
See application file for complete search history.

(56) References Cited

U.S. PATENT DOCUMENTS

| 6,452,595 | B1 | 9/2002 | Montrym et al. |
| 6,532,013 | B1 | 3/2003 | Papakipos et al. |
| 6,535,238 | B1* | 3/2003 | Kressin .................... 348/14.01 |
| 6,577,309 | B2 | 6/2003 | Lindholm et al. |
| 7,363,369 | B2* | 4/2008 | Banerjee et al. ............. 709/224 |
| 2002/0133729 | A1* | 9/2002 | Therien et al. .............. 713/330 |
| 2003/0056123 | A1* | 3/2003 | Hsieh ......................... 713/300 |
| 2004/0161034 | A1* | 8/2004 | Morozov et al. ....... 375/240.03 |
| 2007/0106917 | A1* | 5/2007 | Oh et al. ..................... 713/300 |

FOREIGN PATENT DOCUMENTS

WO    WO9701935    *    1/1997

* cited by examiner

*Primary Examiner*—Van H Nguyen
*Assistant Examiner*—Kenneth Tang
(74) *Attorney, Agent, or Firm*—Cooley Godward Kronish LLP (57) ABSTRACT

A software program includes at least two performance levels. Each performance level has an associated processor utilization. Each performance level corresponds to optimization criteria, such as a quality of data processing performed by the software program. The performance level is selected to maintain processor utilization by the software program within constraints, such as a desired range of processor utilization and a minimum idle thread allocation.

34 Claims, 10 Drawing Sheets

| Encoding level (n) | Noice pre-processing? | Inverse telecine detection? | High quality motion search? | Bidirectional motion prediction? | Half-pel motion vectors? | Field-frame motion estimation? | Field-frame DCT? | Full precision MAD calcuations? |
|---|---|---|---|---|---|---|---|---|
| 0 | No | No | No | No | No | No | No | No |
| 1 | Yes | No | No | No | No | No | No | No |
| 2 | Yes | Yes | No | No | No | No | No | No |
| 3 | Yes | Yes | Yes | No | No | No | No | No |
| 4 | Yes | Yes | Yes | Yes | No | No | No | No |
| 5 | Yes | Yes | Yes | Yes | Yes | No | No | No |
| 6 | Yes | Yes | Yes | Yes | Yes | Yes | No | No |
| 7 | Yes | Yes | Yes | Yes | Yes | Yes | Yes | No |
| 8 | Yes | Yes | Yes | Yes | Yes | Yes | Yes | Yes |

MANAGING A VIDEO ENCODER TO FACILITATE LOADING AND EXECUTING ANOTHER PROGRAM

FIELD OF THE INVENTION

The present invention is generally directed towards management of microprocessor resources. More particularly, the present invention is directed at monitoring and managing a software program's utilization of a microprocessor.

BACKGROUND OF THE INVENTION

As microprocessor speed has increased, software programmers have developed an increasing number of complex software applications that can run on microprocessors. As one example, microprocessors having central processing unit (CPU) clock rates greater than several hundred megahertz permit a variety of audio, video, graphics, and digital signal processing functions to be implemented largely or entirely in software. This has permitted complex software applications to be utilized in a variety of consumer devices that have one or more microprocessors, such as personal computers, media center personal computers, and personal video recorders.

A variety of consumer devices have more than one software application capable of running simultaneously on different execution threads of a microprocessor. One problem that occurs is that a complex software application may consume too large a percentage of the processing power of a microprocessor to permit another software application to load and execute properly. This may result, for example, in other software applications requiring a longer time to load and run slower than is acceptable by a consumer because the complex software consumes more than its fair share of the microprocessor's resources.

The problem of running complex software applications on microprocessors is exacerbated by variations in processor capability. During the manufacture, maintenance, or upgrading of a consumer device, different types of microprocessors may be utilized in the consumer device, which creates a potential variability in the microprocessor capability.

Additionally, the problem of running complex software applications on microprocessors is exacerbated in systems where a user can add or upgrade software. For example, many personal computer systems permit consumers to load new software or make software upgrades that increase the complexity of existing software applications. Thus, a complex software application that works well with other software when consumers first buy their personal computer system may not coexist well with other programs after the consumer has added/upgraded other software applications.

Consumer devices also include other types of integrated circuit processors besides microprocessor CPUs, such as graphics processing units (GPUs), application specific integrated circuits (ASICs), and dedicated specialty processors. Analogous issues occur when complex software is run on such other integrated circuit processors.

Therefore what is desired is an improved apparatus, system, method, and computer program product to manage processor utilization.

SUMMARY OF THE INVENTION

A software program is adapted to have at least two performance levels for processing data, where the performance levels each require a different processor utilization. Processor utilization by the software program is monitored, along with idle thread utilization. A performance level is selected to adjust, if necessary, the performance level such that the processor utilization by the software program and the idle thread usage remain within control constraints.

In one embodiment, a highest performance level corresponding to highest data processing quality is selected that is consistent with the constraints. In one embodiment, the highest performance is selected to maintain processor utilization by the software program within a desired range while maintaining a minimum idle thread allocation for at least a range of operation.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
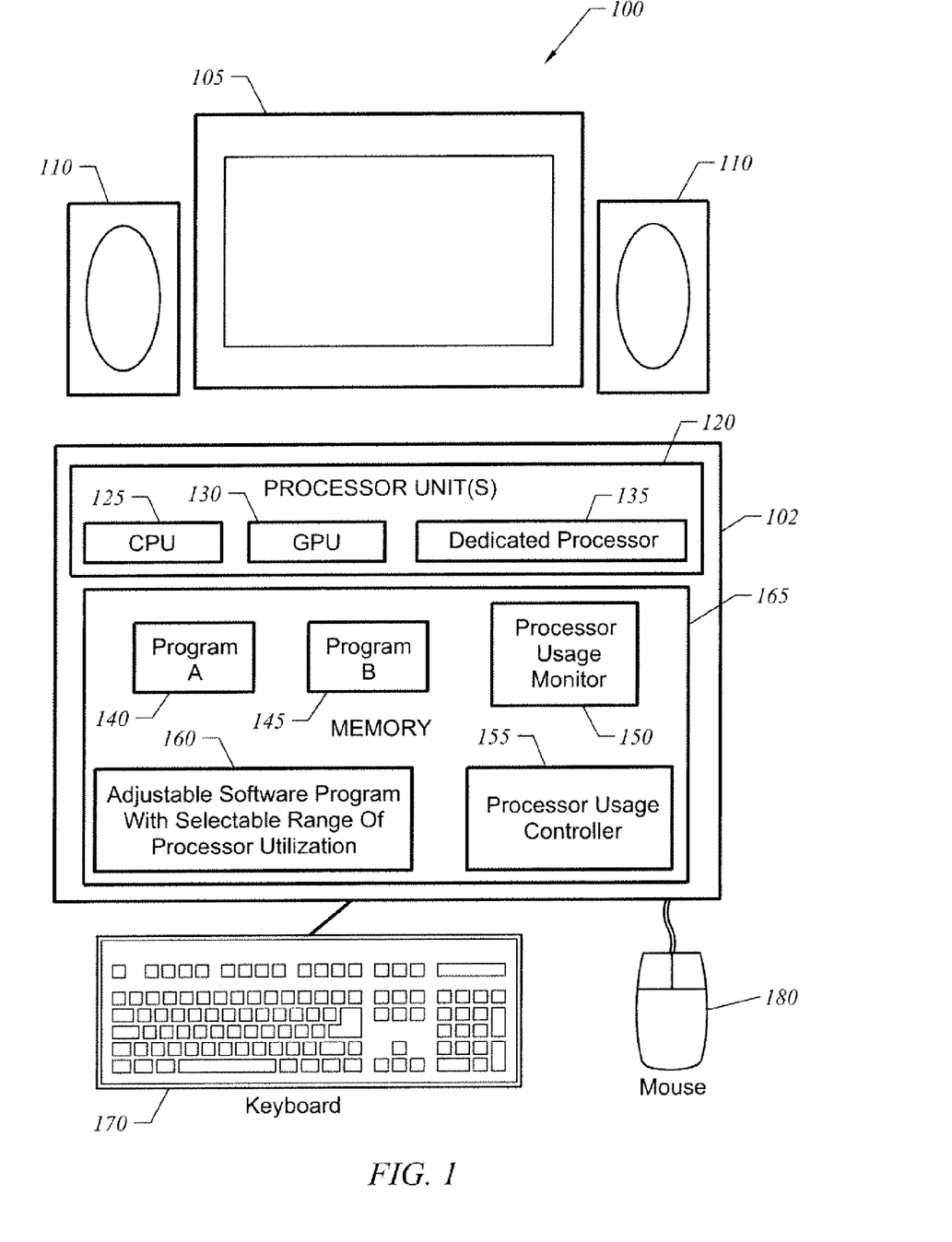
FIG. 1 is a block diagram of a system in accordance with one embodiment of the present invention.

FIG. 1 illustrates a computing system 100 in accordance with one embodiment of the present invention. In one embodiment, computing system 100 is a consumer device, such as a personal computer (PC), media center PC, or an entertainment system having a digital video recording capability, such as an entertainment system having a personal video recorder (PVR). However, it will be understood in the following discussion that computing system 100 is not limited to these examples.

In one embodiment, a display 105 and speakers 110 are provided as an audio-visual interface. A keyboard 170, mouse 180, or other control interface (not shown) may be provided for a user to cause one or more software programs 140, 145, and 160 to run on computing system 100.

Computing system 100 has a processing section 102 that includes a processor module 120 having at least one integrated circuit processor, such as a central processing unit (CPU) 125, graphics processor unit (GPU) 130, or another processor, such as a dedicated processor 135. In one embodiment CPU 125 is implemented as a microprocessor and GPU 130 is implemented as an integrated circuit. In one embodiment, processor module 120 includes two or more CPUs 125 or a hyperthreaded CPU 125 emulating at least two logical processors. In some embodiments, dedicated processor 135 comprises an application specific integrated circuit (ASIC), custom hardware, or other components to perform a dedicated data processing function.

Computer system 100 includes at least one adjustable software program 160 having at least two performance levels for performing a data processing function. Computer system 100 may include other computer programs 140, 145, as well. Computer programs 140, 145, and 160 each include computer instructions stored on at least one memory 165. In some embodiments, an individual computer program 140, 145 or 160 executes on only one of the processors, such as only on CPU 125. However, it will also be understood that in some embodiments an individual computer program may run across two or more of the processors, such as across a CPU 125 and a GPU 130.

Computer system 100 includes a processor usage monitor 150 to measure the processor utilization of adjustable software program 160 with respect to at least one of the processors 125, 130, or 135. In one embodiment, processor usage monitor 150 utilizes a Microsoft Windows® performance monitoring application program interface (API) known as a performance data helper (PDH) for measuring CPU utilization. PDH may be used to allow a program to query the CPU usage of individual CPU processes over a specified time duration. In one embodiment, processor usage monitor 150 comprises computer executable instructions resident on memory 165. However, it will also be understood that processor usage monitor 150 may be implemented in hardware, firmware, and combinations of hardware and software.

Computer system 100 also includes a processor usage controller 155 to adjust the performance level of adjustable software program 160 in response to processor utilization measurements generated by processor usage monitor 150. In one embodiment, processor usage controller 155 comprises computer executable instructions resident on memory 165. However, it will also be understood that processor usage controller 155 may be implemented in hardware, firmware, or combinations of hardware and software.

It will be understood throughout the following discussion that adjustable software program 160, processor usage controller 155, and processor usage monitor 150 may be implemented as separate software programs. Alternatively, adjustable software program 160, processor usage controller 155, and processor usage monitor 150 may be implemented as a single software program.

Figure 2:
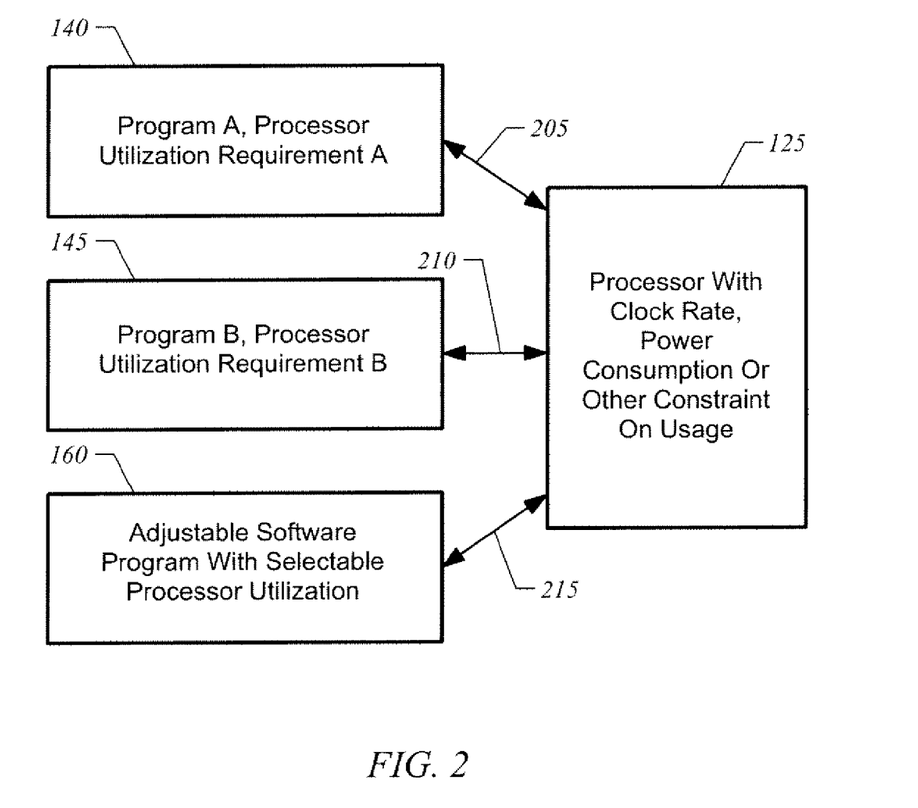
FIG. 2 is a block diagram illustrating possible interactions of a processor with execution threads of software applications in accordance with one embodiment of the present invention.

As illustrated in FIG. 2, a processor, such as CPU 125, may execute threads of execution 205, 210, and 215 for two or more programs. Each thread 205, 210, and 215 places a demand on the processor's resources. If adjustable software program 160 is initially the only program running, then other software programs 140 and 145 will not load rapidly if the processor utilization associated with adjustable software program 160 is too high. In particular, if adjustable software program 160 has too high a level of processor utilization, the idle thread utilization will be too low for other software programs 140 and 145 to start and execute properly.

As described below in more detail, adjustable software program 160 has a selectable performance level that permits an adjustment of the processor utilization associated with adjustable software program 160. The performance levels may correspond to an ordered ranking of optimization criteria. Examples of optimization criteria include data processing quality and data throughput.

In one embodiment, the performance levels may, for example, correspond to an ordered ranking of data processing quality, with the highest performance levels corresponding to the highest quality data processing and the lowest performance levels corresponding to the lowest quality data processing. It will be understood that there may be a discrete or semi-continuous arrangement of performance levels depending upon whether processing quality can be varied incrementally or quasi-continuously.

Since it typically requires more processor resources (e.g., more computations and operations) to perform data processing at a higher quality, the highest performance levels will thus also typically require greater processor utilization. For example, in a PVR it typically takes more computational resources to encode video data at a higher quality. For many applications, a minimum processing quality (e.g., a minimum performance level and a minimum processor utilization) is necessary to achieve a satisfactory result, although a higher processing quality (e.g., a higher performance level and a higher processor utilization) may provide a superior processing result. Thus, selection of a performance level of adjustable software program 160 permits a tradeoff to be made between processing quality and processor utilization.

Adjustable software program 160 may comprise any software program that can be adapted to have performance levels that can be adjusted to change processor utilization. In one embodiment, adjustable software program 160 may permit one or more features of adjustable software program 160 to be selectively enabled/disabled to adjust processor utilization. Thus, in this example a performance level maps to specific sub-processes that are enabled within a larger data processing process performed by adjustable software program 160. Additionally, a performance level may also map to a selection of attributes of sub-processes that are related to tradeoffs between quality and processor utilization (e.g., in a PVR embodiment the tradeoffs may be between video data quality and processor utilization). For example, in a software video encoder a tradeoff may be made between a size of a motion search and video quality. A larger motion search requires more CPU utilization but generally provides better video quality. As illustrative examples, adjustable software program 160 may have one or more parameters for selecting noise reduction processes that are used, prediction algorithms used, a level of sophistication used in data analysis, a level of accuracy used in calculations, error handling processes, a level of detail, number of iterations performed in an iterative process, specific sub-processes utilized to process data, input variables utilized for analysis, and number of outputs generated.

Examples of software applications executable on a CPU that may be adapted to be an adjustable software program 160 include encoders, such as audio encoders, audio preprocessors, video encoders, video preprocessors, and audio or video multiplexors. Other examples include media encoding, including a multi-media encoder and media transcoding, including a multimedia transcoder. In these examples, there is typically a combination of features or attributes are that may be adapted to be dynamically selectable to achieve an adjustable software program 160.

Examples of software applications running on a GPU or across a CPU and a GPU that may be adapted to have more than one performance level include graphics programs for enabling or disabling programmable features that increase GPU utilization. Some GPUs have a variety of programmable features. For example, aspects of programmable GPUs are described in U.S. Pat. No. 6,452,595 entitled "Integrated graphics processing unit with antialiasing," U.S. Pat. No. 6,532,013 entitled "System, method, and article of manufacture for pixel shaders for programmable shading," and U.S. Pat. No. 6,577,309 entitled "System and method for a graphics processing framework embodied utilizing a single semiconductor platform," the contents of each of which are hereby incorporated by reference. In a programmable GPU, commands may be generated that turn on or off other processes that require significant GPU resources, such as anti-aliasing.

As another example of an adjustable software program 160, some types of encoders are implemented as a combination of software running on a CPU interacting with a dedicated processor (e.g., dedicated hardware or an application specific integrated circuit (ASIC) processor). For this case, the adjustable software program 160 may be adapted to have performance levels that adjust processor utilization of the CPU.

Figure 3:
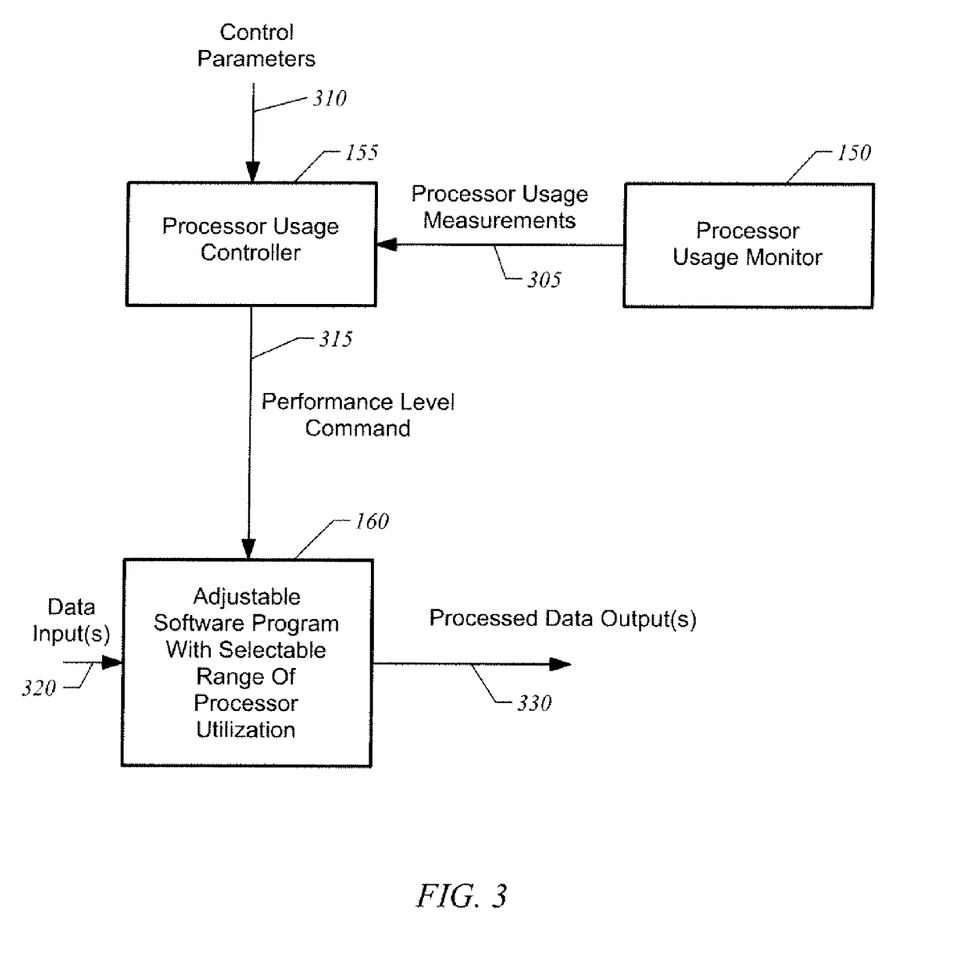
FIG. 3 is a block diagram illustrating a processor utilization control technique in accordance with one embodiment of the present invention.

FIG. 3 is a block diagram illustrating the interaction of processor usage monitor 150, processor usage controller 155, and adjustable software program 160. Adjustable software program 160 receives data input(s) 320 and generates processed data output(s) 330. The quality with which software program 160 processes the data input(s) 320 depends upon the performance level selected by processor usage controller 155. A processor utilization monitor 150 monitors the actual processor utilization devoted to executing adjustable software program 160 on a selected processor 125, 130, or 135 and generates a processor usage measurement 305. The processor utilization may, for example, be measured as a percentage of the available clock cycles available on processor 125 required for executing threads of adjustable software program 160. In one embodiment, idle thread utilization is also measured. It will be understood that remaining processor utilization not be devoted to adjustable software program 160 and idle threads may be inferred to be utilized by other software applications (e.g., software programs 140 and 145).

Processor usage controller 155 selects a performance level for adjustable software program 160 in response to processor usage measurements 305 and constraint control parameters 310. Constraint control parameters 310 may be permanently set or be dynamically programmable. Examples of constraint control parameters 310 include limitations on the range of maximum and minimum processor utilization for adjustable software program 160; constraints on idle thread utilization such as a minimum idle thread utilization for a range of operation; and time constants for making adjustments. Additionally, in some embodiments, a constraint control parameter may include a command to scale back a maximum processor utilization by a scaling factor to reduce power consumption or heat dissipation.

Processor usage controller 155 generates a performance level command 315 to instruct adjustable software program 160 to adjust its performance level to a level selected to achieve a desired target utilization appropriate for the constraints of constraint control parameters 310. In one embodiment, the performance level command 315 may be calculated by determining a target processor utilization consistent with constraint control parameters 310 and identifying a maximum performance level which will bring the actual processor utilization into compliance with the target processor utilization range. For example, if the constraint control parameters include a target idle thread utilization, measurements of the actual processor utilization and idle thread utilization may indicate that the performance level needs to be adjusted down to maintain the target idle thread utilization. Alternatively, measurements of the actual processor utilization and the idle thread utilization may indicate that the performance can be increased to a higher level and still result in a processor utilization and idle thread utilization that is compliant with the constraints. In some embodiments, determining how much to adjust the performance level is determined by generating running estimates of processor utilization for previous instantiations of adjustable software program 160 at different performance levels.

While processor usage controller 155 may adjust the performance level immediately in a single step-response, it will also be understood that embodiments of the present invention include a more complex time response to improve controller response and stability. In some embodiments, processor utilization allocated to idle threads or to adjustable software program 160 is varied over time. For example, if processor utilization and idle thread utilization indicate that performance level can be increased from a lowest performance level to a highest performance level, control stability is improved in some applications if processor usage controller 155 makes the adjustment of performance level as a sequence of two or more smaller changes in performance level rather than a single large jump in performance level. Additionally, the time constant (e.g., time interval) for making each smaller adjustment may be different from each other. It will also be understood that processor usage controller 155 may have time responses for implementing a performance level change that depend upon the current performance level.

Figure 4:
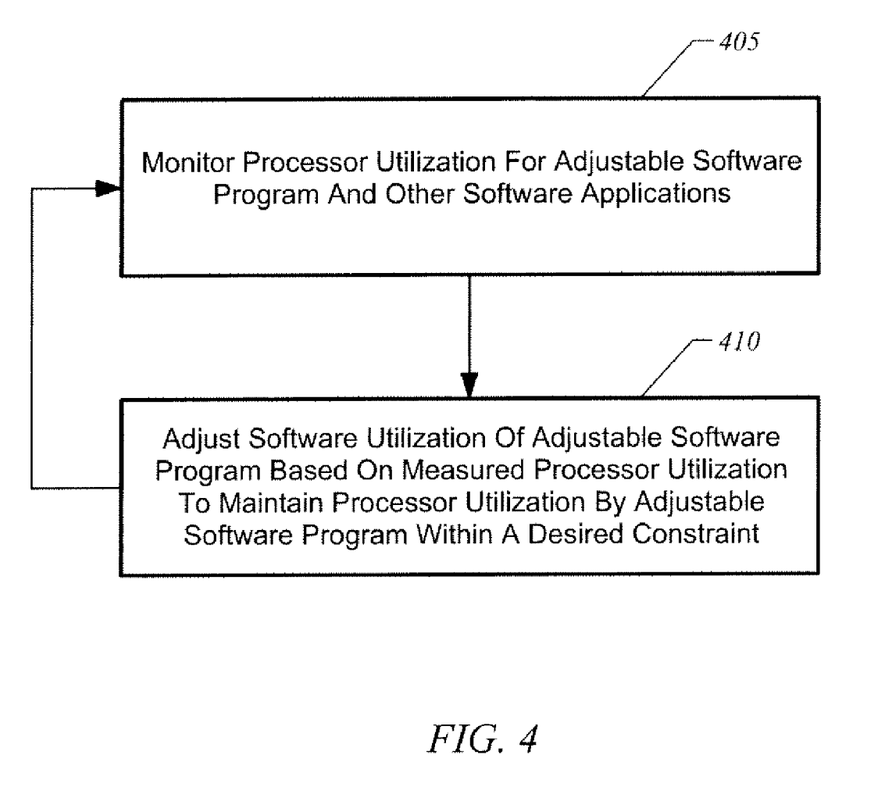
FIG. 4 is a flow chart of a method of controlling processor utilization in accordance with one embodiment of the present invention.

FIG. 4 is a flow chart illustrating one embodiment of a method of controlling processor utilization. A processor's utilization is monitored 405. The performance level of the adjustable software program is adjusted 410 to maintain the adjustable software program's processor utilization within a desired utilization range for the constraints of the current operating condition.

Figure 5:
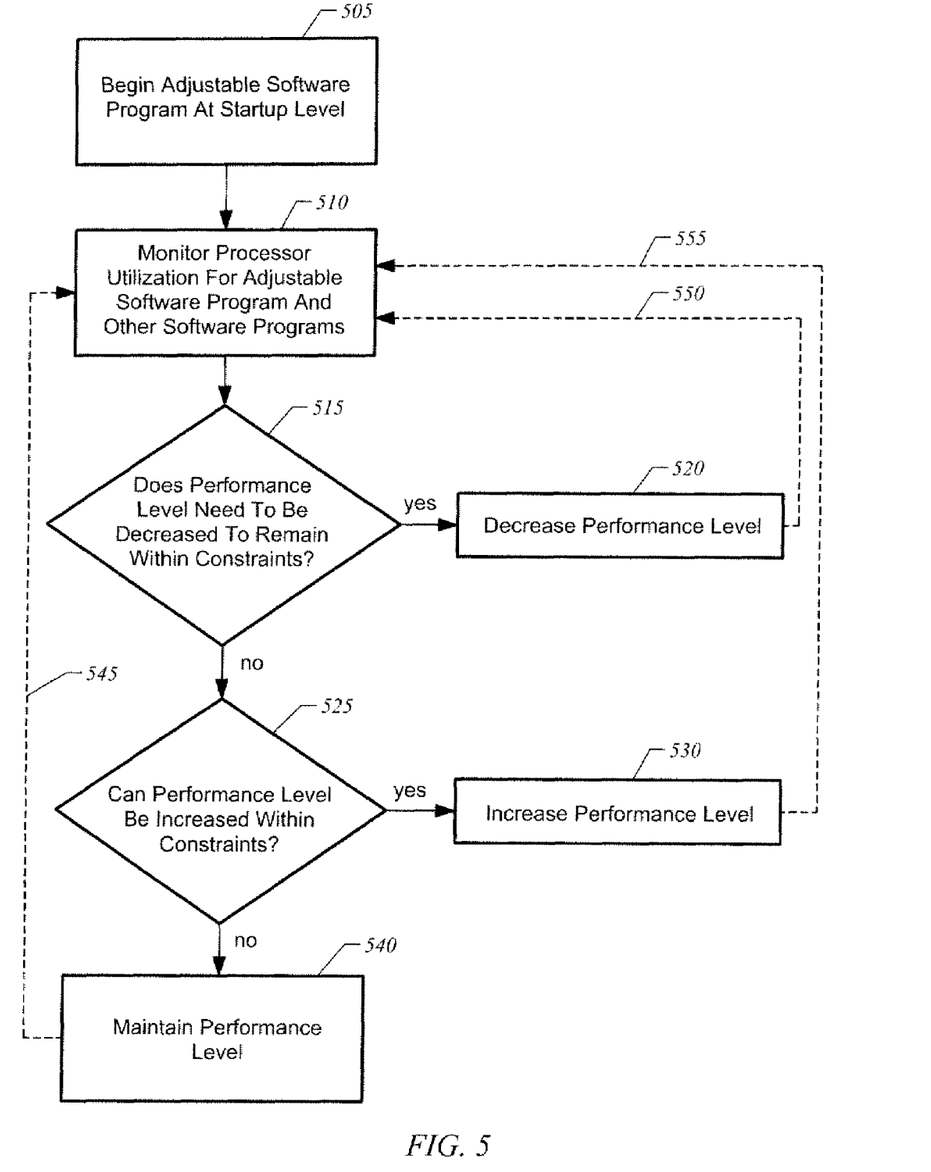
FIG. 5 is a flow chart of a method of controlling processor utilization in accordance with one embodiment of the present invention.

FIG. 5 is a flow chart illustrating another embodiment of a method of selecting processor utilization of adjustable software program 160. At startup, a startup target performance level is selected 505. In one embodiment, the startup target performance level is selected to be significantly lower than a maximum possible performance level. As one example, the startup performance level may be selected to be a low (e.g., the lowest) performance level of adjustable software program 160. In another embodiment, after an initial startup, subsequent startups use a startup performance level selected to be a default value based on the initial startup. Processor utilization is monitored 510. The performance level is decreased 520 if it is determined 515 that a decrease in performance level is required to remain within the control constraints (e.g., constraints on processor utilization and idle thread utilization). The performance level is increased 530 if it is determined that an increase in performance level can be made that is within the constraints. The performance level is otherwise maintained 540. As indicated by dashed lines 545, 550, and 555, after the initial startup, periodic monitoring 510 and determination of adjustments 515 and 525 of performance level may take place.

One benefit of one embodiment of the method illustrated in FIG. 5 is that a performance level is automatically selected for adjustable software program 160 that is the highest performance level consistent with loading and execution of other programs. In one embodiment, the target maximum processor utilization is selected to have sufficient idle thread utilization to facilitate loading and execution of other software applications. In one embodiment, idle thread utilization is preferably about 20% such that the target maximum level is at most 80% for adjustable software program 160. Another benefit of the method illustrated in FIG. 5 is that it facilitates using adjustable software program 160 in computer systems having different processor capabilities, since the software will automatically determine at startup a maximum performance level that can be executed on the processor. As an illustrative example, adjustable software program 160 may have a startup level and a range of performance levels selected so that adjustable software program may adapt two or more different types of processors having different capabilities (e.g., different processor speeds).

In one embodiment, the constraint on maximum processor utilization is adjusted to reduce power consumption. High power consumption generates heat, which increases cooling requirements and which may also shorten processor lifetime. High power consumption also decreases battery lifetime in mobile applications. Consequently, in one embodiment processor usage controller 155 decreases the maximum processor utilization for a condition requiring decreased power consumption. In one embodiment, processor usage controller 155 receives a command to reduce (scale) the maximum processor utilization. However, alternatively, processor usage controller 155 may receive other data inputs indicative of a condition requiring a reduction in power consumption from which it makes a decision to reduce maximum processor utilization.

Figure 6:
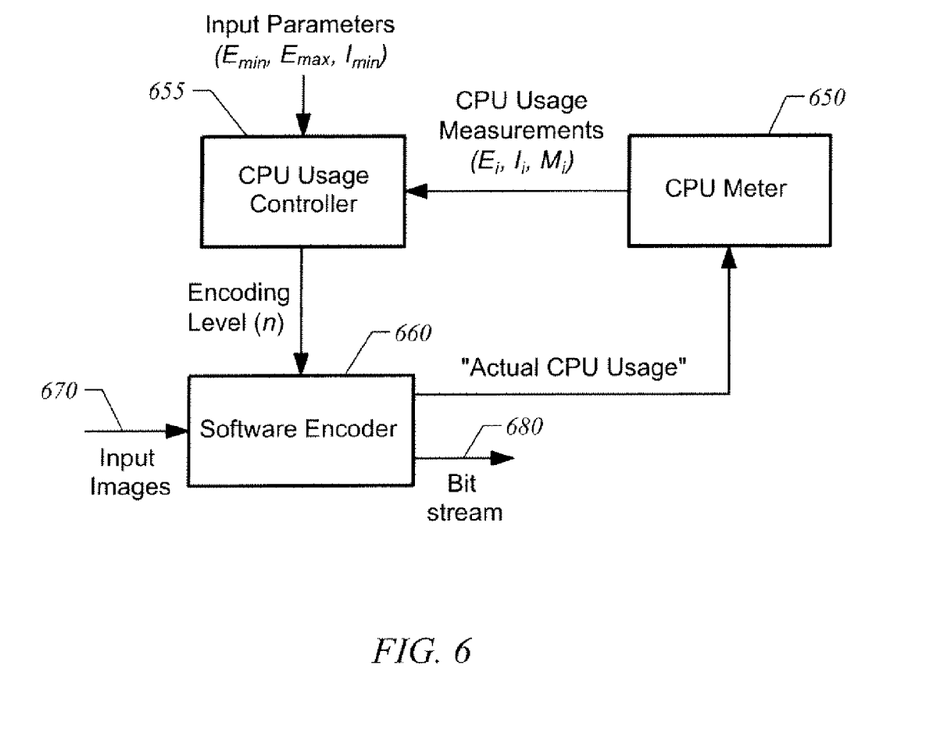
FIG. 6 is a block diagram illustrating CPU utilization management for a software encoder in accordance with one embodiment of the present invention.

As an illustrative example of an adjustable software application 160, one embodiment of an adjustable software video encoder executable on a CPU will now be described. FIG. 6 is a block diagram illustrating one embodiment of a software video encoder 660 in accordance with the present invention. In the embodiment, of FIG. 6, the processor usage monitor 150 is implemented as a CPU meter 650, processor usage controller 155 is implemented as a CPU usage controller 655, and adjustable software program 160 is implemented as software video encoder 660. The other components (not shown) in FIG. 6 may be substantially the same as those described in regards to FIG. 1.

Adjustable software video encoder 660 may be adapted to be compliant with one or more Motion Picture Experts Group (MPEG) standards for encoding video. In embodiments in which software video encoder 660 is used on a PC, software video encoder 660 is preferably designed to be compatible with the execution of other software programs commonly used on PCs, such as web browsers, email readers, word processors, and games.

Software video encoder 660 receives input images 670 and generates an encoded bit stream 680. In one embodiment, software video encoder 660 has performance levels corresponding to n encoding levels, where n is an integer that can take on values from 0 to $N_{max}$ (where $N_{max}$ is the maximum value of n. Each encoding level corresponds to a particular parametric configuration of software encoder 660 (or operating mode), representing a different tradeoff between CPU usage and visual quality (e.g., video quality of bit stream 680). In one embodiment the encoding levels correspond to different modes that trade off video quality for CPU utilization. For example, a more sophisticated motion search algorithm can be enabled to provide better video quality at the expense of additional CPU consumption. Similar tradeoffs can be made by turning on or off a software noise prefiltering algorithm or switching between image resolutions for example of, 720×480 and 352×240.

CPU meter 650 monitors utilization of CPU 125. At periodic time intervals a control algorithm monitors the CPU usage (e.g., where CPU usage is measured as a percentage from 0 to 100%) of the software video encoder 660 and the idle process thread utilization and reports these measurements to CPU usage controller 655. The CPU usage of the encoder process over the time interval i is defined as $E_i$ and the usage of the idle thread over the same interval is defined as $I_i$. The CPU usage of all other miscellaneous software processes is defined by $M_i$ which may be calculated by the equation: $M_i = 100 - E_i - I_i$.

The selection of the time interval over which CPU meter 650 takes measurements involves several tradeoffs. A shorter time interval allows the CPU control algorithm to respond more quickly to changes in CPU usage. However, CPU measurements taken over a shorter duration are generally less accurate. A time interval of 0.5 seconds has empirically been found to be a reasonable value. If the CPU measurements are especially noisy, they can be filtered using a simple recursive infinite impulse response (IIR) filter.

In one embodiment, CPU usage controller 655 has three input constraint control parameters, $I_{min}$, $E_{min}$, and $E_{max}$ that influence tradeoffs that CPU usage controller 655 makes between video quality and CPU utilization. The parameter $E_{min}$ is a minimum CPU allocation for a given encoder process. A minimum encoder CPU allocation is useful to maintain a minimum level of video quality even when the CPU is fully utilized. The parameter, $I_{min}$, specifies a minimum target allocation for the idle thread. In other words, at least $I_{min}$ percent of the CPU should remain idle as long as software video encoder 660 has attained its minimum allocation. Providing an idle allocation minimizes start-up and execution latency of other software applications. The parameter $E_{max}$ is a maximum encoder allocation. The maximum encoder allocation is implicitly upper-bounded by the idle thread allocation. However, there may be circumstances in which specifying an explicit upper bound is desirable. For example, it may be desirable to limit the variability of the encoding quality that would result from a dramatic change in CPU usage.

In one embodiment a time constant, τ, is associated with each target CPU allocation. For example, in one embodiment the idle CPU usage measured over a one second duration should never drop below 10%. Associating a smaller CPU allocation with a shorter time constant can help prevent overreaction by the encoder control algorithm when, for example, the idle thread drops temporarily because of a noisy CPU measurement or a short-term change in CPU activity. Note that a minimum encoder allocation implies a maximum CPU allocation for miscellaneous software processes given by $M_{max} = 100 - E_{min}$.

CPU usage controller 655 utilizes the CPU usage measurements and input parameters to select an encoding level for software video encoder 660. The encoding level, in turn, determines the CPU utilization of software video encoder 660.

The ability of CPU usage controller 655 to regulate software encoder 660's CPU utilization depends upon several factors. To accurately select the encoding level of the encoder to achieve a desired CPU utilization, the CPU usage control algorithm requires accurate predictions of the expected CPU usage of the encoder for each of the encoding levels. Static predictions may not work well since the CPU usage of a software encoder 660 typically depends on a number of variables such as the CPU speed, the video content, the bitrate, and other factors.

Figure 7:
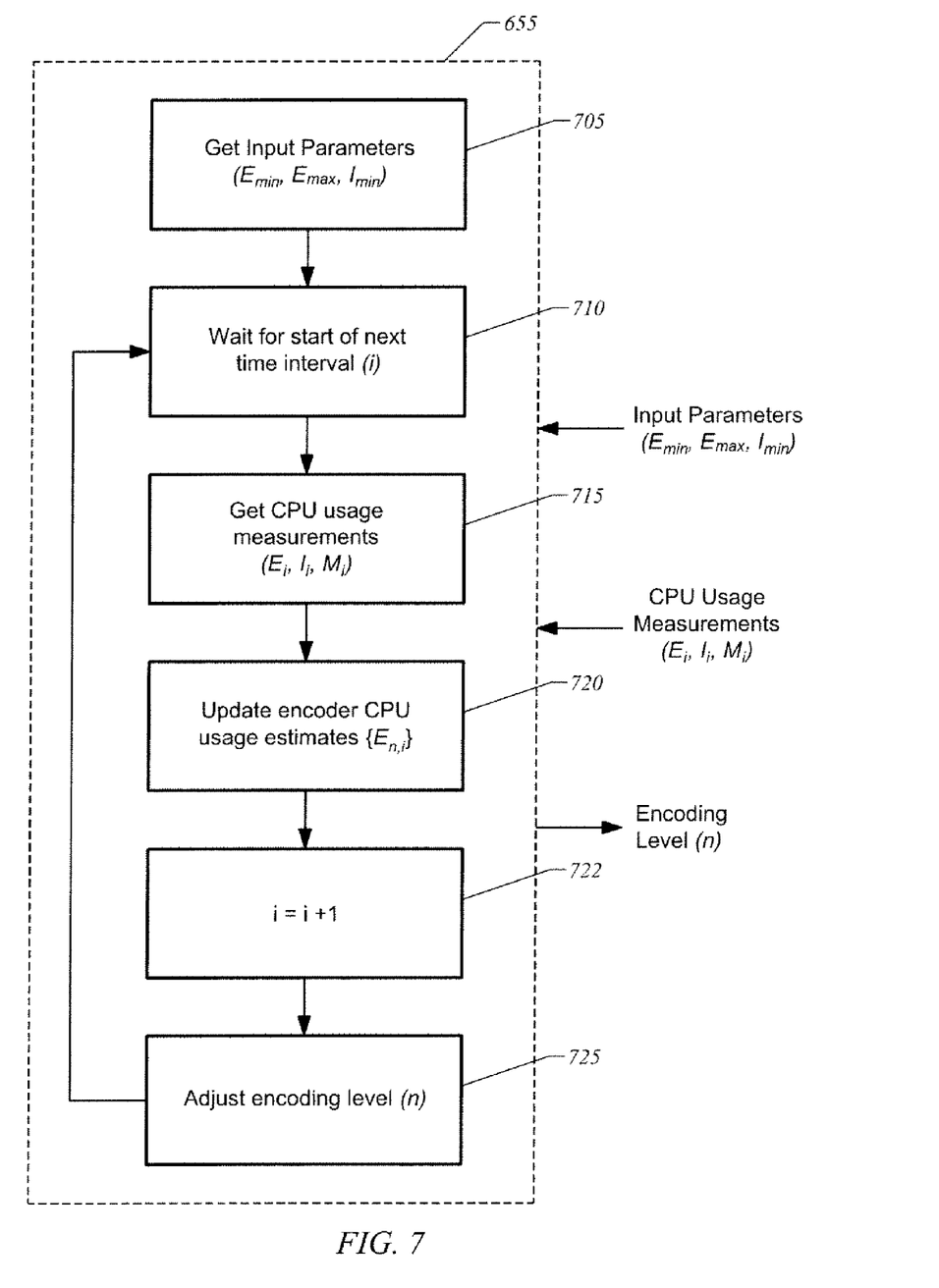
FIG. 7 is a flow chart illustrating a process for determining encoder CPU usage estimates for various encoder levels in accordance with one embodiment of the present invention.

In one embodiment, running estimates are generated of processor utilization for each encoding level based upon measured processor utilization. Referring to FIG. 7, in one embodiment CPU usage controller 655 acquires input control parameters 705 at the start of a time interval 710. CPU usage controller 655 acquires CPU usage measurements 715 for a current encoding level as part of its process of deciding whether to adjust the encoding level 725. The instantaneous CPU usage measurements of the software encoder, $\{E_i\}$, are used to generate dynamic estimates, $\{\overline{E}_{n,i}; 0 \leq n \leq N_{max}\}$, for each encoding level of the encoder n and for each time interval (or iteration) i. In one embodiment, initial CPU usage estimates, $\{\overline{E}_{n,0}; 0 \leq n \leq N_{max}\}$ are calculated for each encoding level and then updated 720 for each new i 722 recursively according to the formula:

$$\overline{E}_{n,i} = \begin{cases} \alpha \cdot \overline{E}_{n,i-1} + (1-\alpha) \cdot E_i & \text{if } n = n_{curr} \\ \overline{E}_{n,i-1} & \text{otherwise} \end{cases},$$

where $n_{curr}$ is the current encoding level of the encoder and $\alpha$ is an aging factor that controls the rate at which the estimate can change. In one embodiment, the estimates are further forced to be monotonic (i.e., $\overline{E}_{n,i} \geq \overline{E}_{n-1,i}$).

One strategy for initializing the CPU estimates, $\{\overline{E}_{n,0}; 0 \leq n \leq N_{max}\}$, on a new system is to simply average the first K available measurements of encoder usage for each respective level. This approach requires that the encoder be run at each encoding level for an adequate period to obtain a reasonably accurate CPU usage estimate for that level. Once sufficiently accurate estimates have been generated, they can be saved for the purpose of initializing the CPU control algorithm in subsequent encoder instantiations.

Figure 8:
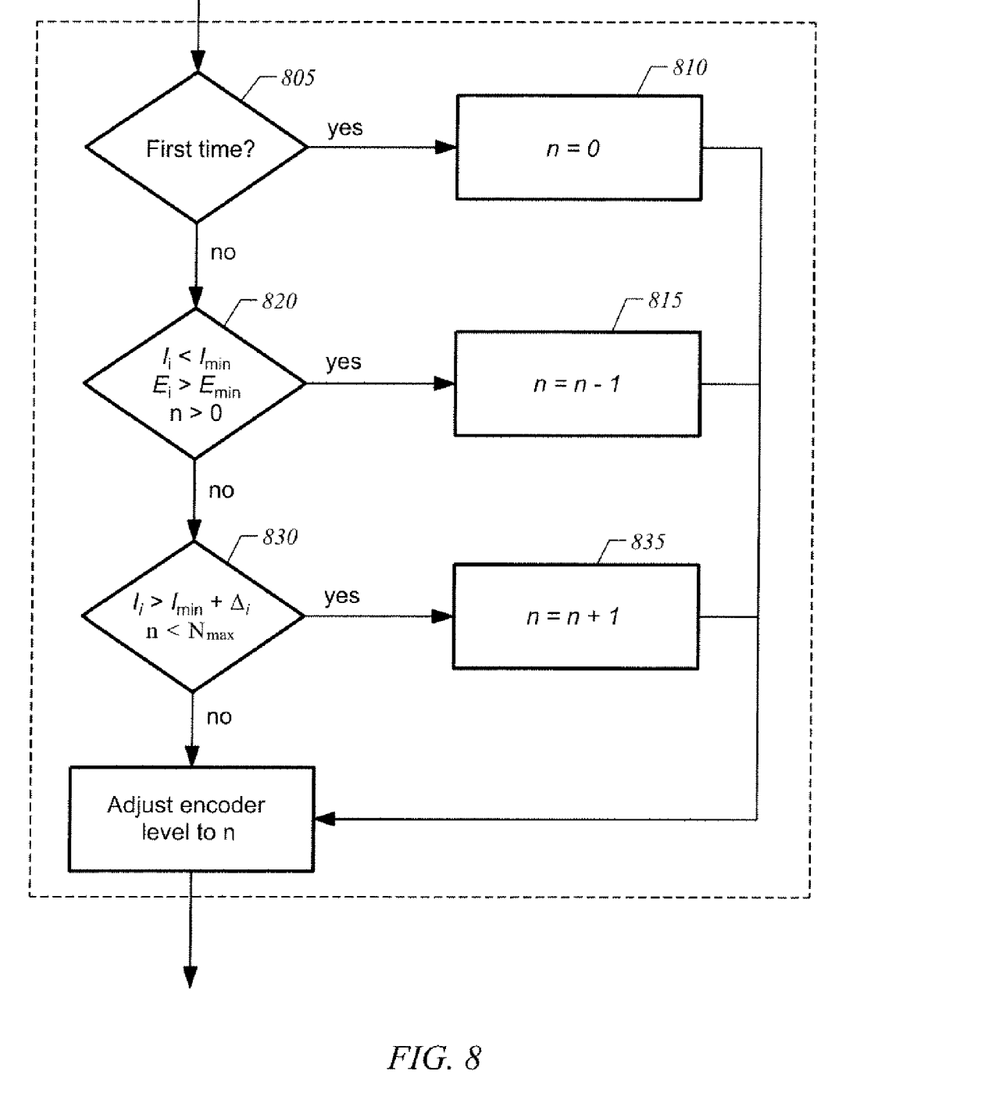
FIG. 8 is a flow chart illustrating selection of an encoder level in accordance with one embodiment of the present invention.

FIG. 8 is a flowchart illustrating one embodiment of a method of incrementing and decrementing encoder levels. CPU usage controller 655 responds to deviations in the CPU usage measurements $E_i$ and $I_i$ by dynamically decrementing or incrementing the encoding level n of the encoder at the completion of each time interval i. The encoding level n is decremented 815 to n=n−1 in response to determining that the following three conditions 820 are met:

$I_i < I_{min}$, $E_i > E_{min}$, n>0.

The encoding level is incremented 835 in response to determining 830 that the following two conditions are met:

$I_i > I_{min} + \Delta_i$, $n < N_{max}$ where $\Delta_i$ is the expected increase in CPU usage that will result if the encoding level is increased and is given by:

$\Delta_i = \overline{E}_{n+1,i} - \overline{E}_{n,i}$.

Because the estimates for CPU usage increase monotonically with encoding level, $\Delta_i$ is assured to be non-negative, and therefore the conditions for decrementing and incrementing the encoding level are mutually exclusive. Note that in one embodiment that the first startup adjustment 805 is to select a target startup level 810 corresponding to the lowest (n=0) encoding level.

Additional heuristics or conditions can be introduced to prevent the adjustment of the encoding level from being overly reactive due to noisy or time-varying CPU measurements. The overly reactive behavior manifests itself when the algorithm alternately increases and lowers the encoding level in rapid succession.

It will also be understood that the software encoder can include software encoders designed to implement multiple simultaneous video encoding processes, such as recording two or more simultaneous television shows using a single PVR. In this case, the computational effort will scale approximately as the number of simultaneous video encoding processes, assuming that each video encoding process has the same performance level.

Figure 9:
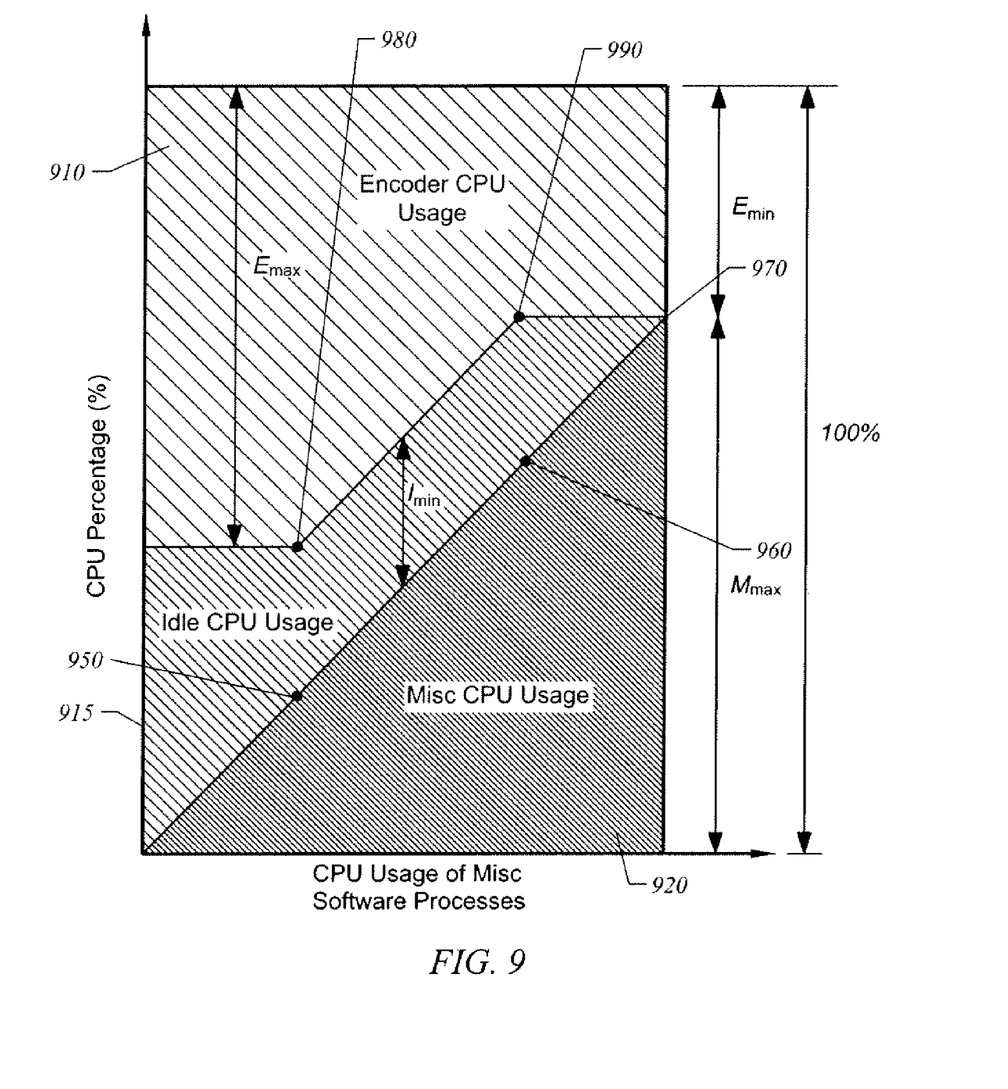
FIG. 9 illustrates variation in a software encoder's CPU usage as a function of the CPU usage of other software processes in accordance with one embodiment of the present invention.

FIG. 9 is an exemplary graph illustrating video encoder CPU usage 910 and idle thread CPU usage 915 as a function of miscellaneous CPU usage 920 by other software programs. The example of FIG. 9 corresponds to parameters for an embodiment in which software video encoder 660 is used to record television shows for a personal video recorder, such as in a media center PC having a PVR capability. In one embodiment, the parameters illustrated in FIG. 9 correspond to an application in which software video encoder 660 is used to record content (e.g., television shows) onto a storage medium of a media center PC. Another program (not illustrated in FIG. 1) may be used to perform the PVR functionality.

In the example of FIG. 9, the minimum idle thread utilization is set to a level to facilitate loading and execution of other programs. A minimum idle thread allocation, $I_{min}$, may be set to 20% if most applications on a particular CPU and operating system require a CPU headroom of 20% to start-up and/or execute smoothly. To guarantee a particular minimum visual quality, the minimum encoder utilization, $E_{min}$, may be set to a minimum level, such as 30%, which implies the maximum CPU allocation for miscellaneous software processes is $M_{max}$=70%. Finally, to permit a high level of video quality to be recorded when other applications do not require significant CPU resources, a maximum CPU encoder CPU utilization, $E_{max}$, may be set to 60%.

The video encoder CPU usage 910, idle CPU usage 915, and miscellaneous CPU usage 920 must add up to 100% CPU utilization at any one time. In the simplest case, the video encoding starts at some initial time with the CPU idle, and the CPU control algorithm increases an encoding level of the video encoder 660 until the video encoder 660 achieves its maximum CPU usage (to increase video quality) of 60%, leaving 40% idle. If a user starts to run other software applications, the miscellaneous CPU usage 920 increases. If the miscellaneous CPU usage 920 is relatively small, say 10%, these applications do not impact the video encoder because the combined CPU usage of the encoder at 60% and the miscellaneous applications at 10% still leaves 30% of the CPU idle.

However, if the miscellaneous CPU usage increases to a threshold level 950, the CPU usage controller 655 may have to begin reducing the encoder CPU usage 910 for any further increases in miscellaneous CPU Usage 920. For example, if the miscellaneous CPU usage 920 increases its CPU utilization to 30%, the CPU control usage controller 655 needs to reduce the encoder CPU load from 60% to 50% in order to maintain an idle allocation of 20%. Note that for a range of operation for miscellaneous CPU usage 920 varying between a first threshold 950 and a second threshold 960 that the encoder CPU usage 910 may adapt between points 980 and 990 to preserve the minimum idle utilization.

When the miscellaneous CPU usage 920 reaches 50% at threshold 960, the encoder drops to its minimum allocation of 30%. Further increases in miscellaneous CPU usage 920 are taken from the idle budget, since the encoder CPU usage is fixed at a minimum value. Eventually, at point 970 a maximum CPU usage of miscellaneous applications is reached at 70%, leaving 30% for the encoder, and 0% idle.

As previously described, in one embodiment, software video encoder 660 is used in a computer system, such as media center PC, having a PVR functionality. It is desirable that a PVR record the show with the highest quality in the smallest file size while allowing the user flexibility to start-up and run other applications concurrently without causing dropped frames in the software video encoder 660. In accordance with one embodiment of the present invention, the software encoder has a range of minimum to maximum CPU utilization that is consistent with an acceptable range of video quality. While it is preferable, in terms of video quality, to operate at a higher CPU utilization, in accordance with the present invention CPU utilization may be decreased as needed to permit other software applications to run properly.

In one embodiment, software video encoder 660 includes variable bit rate (VBR) encoding, although it will be understood that an alternate embodiment includes constant bit rate (CBR) encoding. More consistent visual quality can be obtained if the video encoder employs a rate control scheme that reacts slowly to deviations between the actual and the target average bit rate. A variable bit rate encoding is preferable to handle spikes in CPU usage by other software applications. For example, consider the case in which the CPU usage controller 655 reduces the encoding level in response to a temporary spike in CPU usage by other applications. A VBR rate control algorithm will keep the quantization step-size relatively constant, and the immediate effect will be an increase in bit rate rather than a reduction in visual quality due to the reduced rate-distortion efficiency of the lower encoding level. For a VBR algorithm, only a permanent increase in miscellaneous CPU usage will cause a reduction in visual quality as the rate control algorithm is forced to slowly increase the quantization step-size to achieve the target average bit rate.

Figure 10:
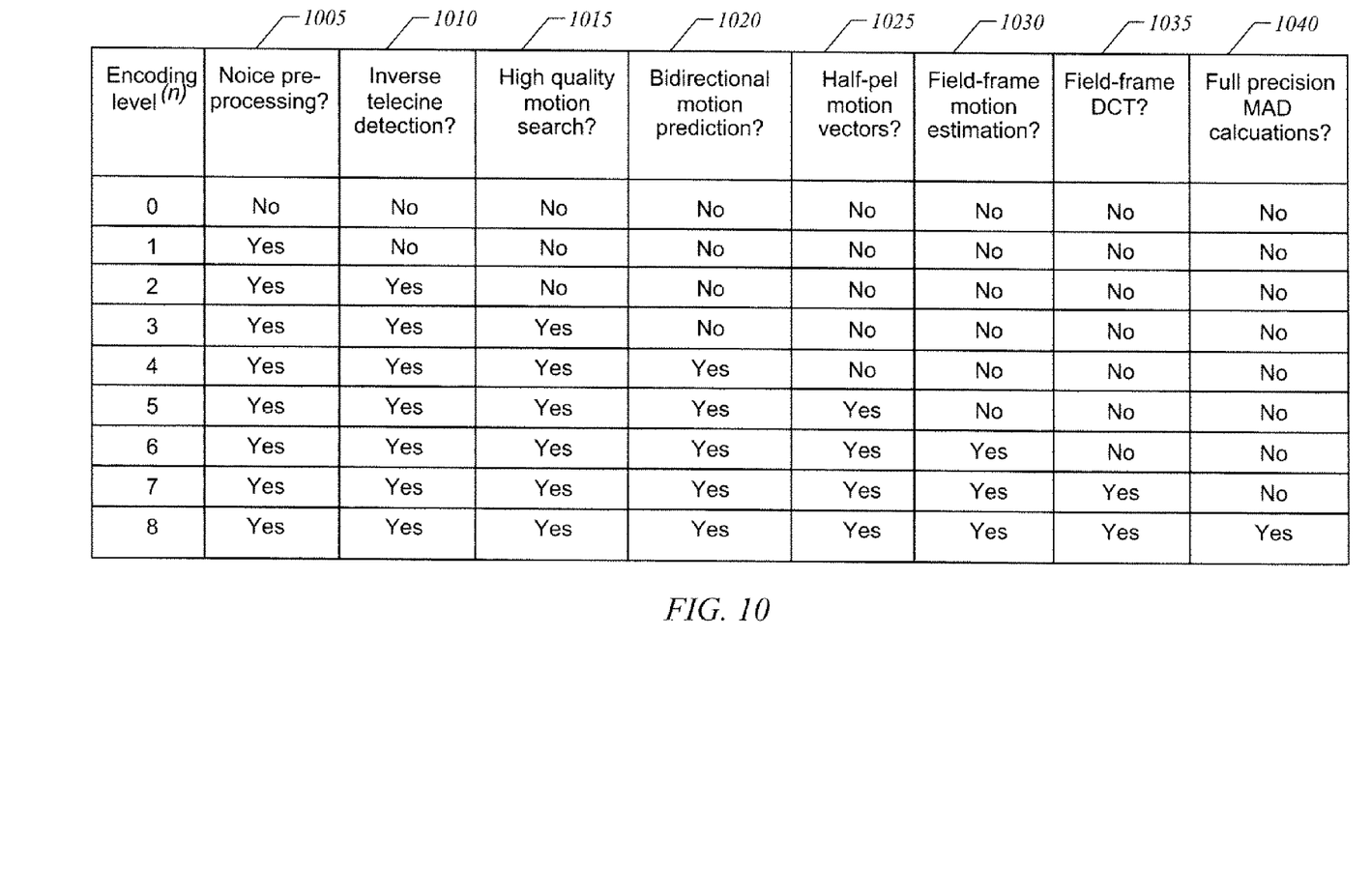
FIG. 10 is a table illustrating an exemplary mapping of functions enabled for different encoding levels in accordance with one embodiment of the present invention.

An example mapping of encoding level to encoder configuration modes is shown in FIG. 10 for one embodiment of software video encoder 660. In one embodiment, the encoding levels correspond to decisions to select combinations of noise pre-processing 1005, inverse telecine detection 1010, high quality motion search 1015, bidirectional motion prediction 1020, half-pel motion vectors 1025, full frame motion estimation 1030, field frame discrete cosine transformation (DCT) 1035, and full precision mean absolute difference (MAD) calculations 1040. The mappings between the encoding levels and the encoder configurations are chosen so that the predicted CPU usages for each level increase monotonically with n.

As previously discussed, embodiments of the present invention include optimization criteria other than data processing quality, such as throughput. In a variety of applications a user desires that a program, such as one performing a non-real time data processing function, perform its function in the background as quickly as possible. However, a user may also want to run other programs while the data processing function is being performed. If the program running in the background has too high of a processor utilization then other program will not start and execute properly. In accordance with one embodiment of the present invention, the performance levels may correspond to different tradeoffs between processor utilization and throughput with respect to at least a minimum quality.

As one example, there are a variety of transcoding applications in which a user may desire as high a throughput as possible but also want to run other software programs on the computer while the transcoding process is being performed. Transcoding is used, for example, to convert a recorded show or song to be viewed on another type of device (e.g., converting from the format of a laptop to that of a handheld pocket PC type device). Transcoding may be used to reduce the storage required for a show or song. Transcoding also may be used to store a show or song onto another type of medium, such as a CD. In offline transcoding a user may schedule conversion (transcoding) of a recorded television show or song from one format to another format or from a higher bit-rate to a lower bit-rate. The conversion process may take a significant amount of time, depending upon the data size of the file being converted, such that it is scheduled in the background. The user typically desires that the conversion is completed as fast as possible, i.e., at the highest possible throughput. In accordance with one embodiment of the present invention, a transcoding program has at least two different performance levels corresponding to two different tradeoffs between processor utilization and throughput. In analogy to previously discussed examples, the processor usage and idle thread utilization are monitoring and the performance level of the transcoding program is selected to be within control constraints such that other programs have sufficient idle thread utilization to start and execute properly.

It will also be understood that an embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method of managing utilization of an integrated circuit (IC) processor, comprising:

monitoring processor utilization by an adjustable software video encoder program running on a first thread, the adjustable video software encoder program having at least two different performance levels associated with a video quality of individual frames, wherein each performance level has a different associated IC processor utilization and said performance levels comprise video encoding levels corresponding to an encoder configuration;

selecting a performance level corresponding to a video encoding level to achieve a highest possible video quality while maintaining an idle thread utilization above a minimum threshold selected to permit another software program to load and execute; and generating running estimates of processor utilization for previous instantiations of the adjustable software video encoder program to determine how much to adjust said performance levels.

2. The method of claim 1, further comprising:
in a startup mode of operation, selecting a startup performance level of said adjustable software video encoder program to have the startup performance level with a processor utilization below a maximum IC processor utilization by a margin selected to accommodate differences in processor performance of at least two different types of IC processors.

3. The method of claim 1, further comprising:
in a startup mode of operation, selecting a minimum performance level as a starting performance level.

4. The method of claim 1, wherein said encoding levels affect at least one of a noise reduction process, a prediction algorithm, a level of accuracy, a level of detail, a level of sophistication used in data analysis, a number of iterations used, error handling processes, and a size of a motions search.

5. The method of claim 1, wherein said encoding levels correspond to decisions to select combinations of at least two of noise pre-processing, inverse telecine detection, high quality motion search, bidirectional motion search, half-pel motion vectors, full frame motion estimation, field frame discrete cosine transformation, and full precision mean absolute difference calculations.

6. The method of claim 1, wherein said encoding levels affect at least one of a noise filtering process and image resolution.

7. A method of managing utilization of an integrated circuit (IC) processor, comprising:

monitoring processor utilization by an adjustable software video encoder program running on a first thread, the adjustable video software encoder program having at least two different performance levels associated with a video quality of individual frames, wherein each performance level has a different associated IC processor utilization and said performance levels comprise video encoding levels corresponding to an encoder configuration;

selecting a performance level corresponding to a video encoding level to achieve a highest possible video quality while maintaining an idle thread utilization above a minimum threshold selected to permit another software program to load and execute, and in a startup mode of operation, selecting a startup performance level of said adjustable software video encoder program to have the startup performance level with a processor utilization below a maximum IC processor utilization by a margin selected to accommodate differences in processor performance of at least two different types of IC processors.

8. The method of claim 7, wherein said encoding levels affect at least one of a noise reduction process, a prediction algorithm, a level of accuracy, a level of detail, a level of sophistication used in data analysis, a number of iterations used, error handling processes, and a size of a motions search.

9. The method of claim 7, wherein said encoding levels correspond to decisions to select combinations of at least two of noise pre-processing, inverse telecine detection, high quality motion search, bidirectional motion search, half-pel motion vectors, full frame motion estimation, field frame discrete cosine transformation, and full precision mean absolute difference calculations.

10. The method of claim 7, wherein said encoding levels affect at least one of a noise filtering process and image resolution.

11. A method of managing processor utilization in a video system, comprising:

providing a software video encoder having a plurality of encoding levels, each encoding level having a different associated processor utilization, where each encoding level corresponds to an encoder configuration affecting a video quality of individual frames;

monitoring processor utilization of said software video encoder and of idle thread utilization;

determining a greatest encoding level of said video encoder to maintain a minimum idle thread utilization above a minimum threshold selected to permit another software program to load and execute;

wherein said software video encoder automatically adjusts its encoding level to achieve the best video quality while maintaining idle thread utilization to permit said another software program to load and execute; and generating running estimates of processor utilization for previous instantiations of the adjustable software video encoder program to determine how much to adjust said encoding levels.

12. The method of claim 11, wherein said encoding levels affect at least one of a noise reduction process, a prediction algorithm, a level of accuracy, a level of detail, a level of sophistication used in data analysis, a number of iterations used, error handling processes, and a size of a motions search.

13. The method of claim 11, wherein said encoding levels correspond to decisions to select combinations of at least two of noise pre-processing, inverse telecine detection, high quality motion search, bidirectional motion search, half-pel motion vectors, full frame motion estimation, field frame discrete cosine transformation, and full precision mean absolute difference calculations.

14. The method of claim 11, wherein said encoding levels affect at least one of a noise filtering process and image resolution.

15. A method of managing processor utilization in a video system, comprising:

providing a software video encoder having a plurality of encoding levels, each encoding level having a different associated processor utilization, where each encoding level corresponds to an encoder configuration affecting a video quality of individual frames;

monitoring processor utilization of said software video encoder and of idle thread utilization;

determining a greatest encoding level of said software video encoder to maintain a minimum idle thread utilization above a minimum threshold selected to permit another software program to load and execute;

wherein said software video encoder automatically adjusts its encoding level to achieve the best video quality while maintaining idle thread utilization to permit said another software program to load and execute; and in a startup mode of operation, selecting a startup encoding level of said software video encoder to have the startup encoding level with a processor utilization below a maximum processor utilization by a margin selected to accommodate differences in processor performance of at least two different types of processors.

16. The method of claim 15, wherein said encoding levels affect at least one of a noise reduction process, a prediction algorithm, a level of accuracy, a level of detail, a level of sophistication used in data analysis, a number of iterations used, error handling processes, and a size of a motions search.

17. The method of claim 15, wherein said encoding levels correspond to decisions to select combinations of at least two of noise pre-processing, inverse telecine detection, high quality motion search, bidirectional motion search, half-pel motion vectors, full frame motion estimation, field frame discrete cosine transformation, and full precision mean absolute difference calculations.

18. The method of claim 15, wherein said encoding levels affect at least one of a noise filtering process and image resolution.

19. A computer readable medium having computer code comprising instructions selected to:

monitor processor utilization by an adjustable software video encoder program running on a first thread, the adjustable video encoder program having at least two different performance levels, wherein said performance levels comprise encoding levels corresponding to an encoder configuration related to video quality;

select a performance level to achieve a highest possible video quality of individual frames while maintaining an idle thread utilization above a minimum threshold selected to permit another software program to load and execute; and generate running estimates of processor utilization for previous instantiations of the adjustable software video encoder program to determine how much to adjust said performance levels.

20. The computer readable medium of claim 19, wherein said encoding levels correspond to decisions to select combinations of at least two of noise pre-processing, inverse telecine detection, high quality motion search, bidirectional motion search, half-pel motion vectors, full frame motion estimation, field frame discrete cosine transformation, and full precision mean absolute difference calculations.

21. The computer readable medium of claim 19, wherein said encoding levels affect at least one of a noise filtering process and image resolution.

22. The computer readable medium of claim 19, wherein said encoding levels affect at least one of a noise reduction process, a prediction algorithm, a level of accuracy, a level of detail, a level of sophistication used in data analysis, a number of iterations used, error handling processes, and a size of a motions search.

23. A computer readable medium having computer code comprising instructions selected to:

monitor processor utilization of a video encoder and of idle thread utilization, the video encoder having a plurality of encoding levels each encoding level having a different associated processor utilization, where each encoding level corresponds to an encoder configuration affecting a video quality of individual frames;

determine a greatest encoding level of the video encoder to maintain a minimum idle thread utilization to maintain an idle thread utilization above a minimum threshold selected to permit another program to load and execute;

adjusting the encoding level to achieve the best video quality of individual frames while maintaining idle thread utilization to permit said another software program to load and execute; and generate running estimates of processor utilization for previous instantiations of the video encoder to determine how much to adjust said performance levels.

24. The computer readable medium of claim 23, wherein said encoding levels affect at least one of a noise reduction process, a prediction algorithm, a level of accuracy, a level of detail, a level of sophistication used in data analysis, a number of iterations used, error handling processes, and a size of a motions search.

25. The computer readable medium of claim 23, wherein said encoding levels correspond to decisions to select combinations of noise pre-processing, inverse telecine detection, high quality motion search, bidirectional motion search, half-pel motion vectors, full frame motion estimation, field frame discrete cosine transformation, and full precision mean absolute difference calculations.

26. The computer readable medium of claim 23, wherein said encoding levels affect at least one of a noise filtering process and image resolution.

27. A computer readable medium having computer code comprising instructions selected to:

monitor processor utilization by an adjustable software video encoder program running on a first thread, the adjustable software video encoder program having at least two different performance levels, wherein said performance levels comprise encoding levels corresponding to an encoder configuration related to video quality;

select a performance level to achieve a highest possible video quality of individual frames while maintaining an idle thread utilization above a minimum threshold selected to permit another software program to load and execute; and in a startup mode of operation selecting a startup encoding level of said adjustable software video encoder program to have the startup encoding level with a processor utilization below a maximum processor utilization by a margin selected to accommodate differences in processor performance of at least two different types of processors.

28. The computer readable medium of claim 27, wherein said encoding levels affect at least one of a noise reduction process, a prediction algorithm, a level of accuracy, a level of detail, a level of sophistication used in data analysis, a number of iterations used, error handling processes, and a size of a motions search.

29. The computer readable medium of claim 27, wherein said encoding levels correspond to decisions to select combinations of at least two of noise pre-processing, inverse telecine detection, high quality motion search, bidirectional motion search, half-pel motion vectors, full frame motion estimation, field frame discrete cosine transformation, and full precision mean absolute difference calculations.

30. The computer readable medium of claim 27, wherein said encoding levels affect at least one of a noise filtering process and image resolution.

31. A computer readable medium having computer code comprising instructions selected to:

determine a greatest encoding level of a video encoder having a plurality of encoding levels to maintain a minimum idle thread utilization to maintain an idle thread utilization above a minimum threshold selected to permit another program to load and execute;

adjusting the encoding level to achieve the best video quality of individual frames while maintaining idle thread utilization to permit said another software program to load and executes and in a startup mode of operation, selecting a startup encoding level of said video encoder to have the startup encoding level with a processor utilization below a maximum processor utilization by a margin selected to accommodate differences in processor performance of at least two different types of processors.

32. The computer readable medium of claim 31, wherein said encoding levels affect at least one of a noise reduction process, a prediction algorithm, a level of accuracy, a level of detail, a level of sophistication used in data analysis, a number of iterations used, error handling processes, and a size of a motions search.

33. The computer readable medium of claim 31, wherein said encoding levels correspond to decisions to select combinations of at least two of noise pre-processing, inverse telecine detection, high quality motion search, bidirectional motion search, half-pel motion vectors, full frame motion estimation, field frame discrete cosine transformation, and full precision mean absolute difference calculations.

34. The computer readable medium of claim 31, wherein said encoding levels affect at least one of a noise filtering process and image resolution.

* * * * *